(12) United States Patent
Tsao et al.

(10) Patent No.: US 9,151,650 B2
(45) Date of Patent: Oct. 6, 2015

(54) FLOW VELOCITY METER HAVING SIGNAL GENERATING MODULE WITH PHASE LOCKED LOOP FOR GENERATING CONTINUOUS WAVE SIGNAL

(71) Applicant: U&U ENGINEERING INC, Taipei (TW)

(72) Inventors: Ping-Chang Tsao, Taipei (TW); Hung-Chun Lin, Taipei (TW); Shang-Fong Chiu, Taipei (TW); Pei-San Tsai, Taipei (TW); Chi-Ho Chang, Taipei (TW); Yin-Sung Hsu, Taipei (TW); Chien-Jung Liu, Taipei (TW); Chih-Wei Huang, Taipei (TW)

( * ) Notice: Subject to any disclaimer, the term of this patent is extended or adjusted under 35 U.S.C. 154(b) by 91 days.

(21) Appl. No.: 14/095,720

(22) Filed: Dec. 3, 2013

(65) Prior Publication Data

US 2015/0096384 A1    Apr. 9, 2015

(30) Foreign Application Priority Data

Oct. 4, 2013   (TW) .............................. 102136036 A

(51) Int. Cl.
*G01F 1/66*    (2006.01)
*G01P 5/00*    (2006.01)

(52) U.S. Cl.
CPC .. *G01F 1/663* (2013.01); *G01P 5/00* (2013.01)

(58) Field of Classification Search
None
See application file for complete search history.

(56) References Cited

U.S. PATENT DOCUMENTS

| | | | | |
|---|---|---|---|---|
| 5,150,333 | A * | 9/1992 | Scherbatskoy | .................. 367/83 |
| 2008/0088507 | A1* | 4/2008 | Smith et al. | .................. 342/386 |

FOREIGN PATENT DOCUMENTS

| | | |
|---|---|---|
| CN | 1719279 A | 1/2006 |
| CN | 201600384 U | 10/2010 |
| CN | 103033643 A | 4/2013 |
| TW | 201307811 A | 2/2013 |
| WO | 2013121913 A1 | 8/2013 |

* cited by examiner

*Primary Examiner* — Harshad R Patel
(74) *Attorney, Agent, or Firm* — Lowe Hauptman & Ham, LLP

(57) ABSTRACT

A flow velocity meter is disclosed. The flow velocity meter utilizes a phase locked loop to generate an output signal and outputs the output signal to a current under test. The flow velocity meter receives a reflection signal from the current under test to calculate a speed of the current under test according to a reflection signal and a frequency difference between the output signal and the reflection signal. The flow velocity meter further includes an inclinometer for measuring a depression angle between a water level and a normal direction of the flow velocity meter and measuring a horizontal angle. The flow velocity meter can be adjusted its orientation when being installed according to the measured angles.

17 Claims, 4 Drawing Sheets

FLOW VELOCITY METER HAVING SIGNAL GENERATING MODULE WITH PHASE LOCKED LOOP FOR GENERATING CONTINUOUS WAVE SIGNAL

CROSS REFERENCE TO RELATED APPLICATION

This application claims priority to Taiwan Application Serial Number 102136036, filed on Oct. 4, 2013, which are herein incorporated by reference.

BACKGROUND OF THE INVENTION

1. Field of the Invention

The present invention relates to a flow velocity meter, more particularly, to a flow velocity meter capable of transmitting continuous waves with specific frequencies for measuring a speed of a current according to a frequency difference between a transmitted wave and a reflected wave.

2. Description of the Prior Art

A flow velocity meter is used for measuring a speed of a current under test. For instance, it can calculate the speed of current in a period of time is after measuring the speed of current in a river or stream and further judge if damage occurs in river downstream or if a reservoir at river downstream necessarily sluices.

Acoustic Doppler Velocimeter (ADV) is the most known flow velocity meter in the prior art besides of velocity measuring devices with mechanical vortex valve. The ADV measures a flow speed of river or fluids at a single point in two dimensions or three dimensions by three transducers in array. The transducers in the middle transmit a high power pulse wave along the axis of the device, and the three transducers in array receive.

According to Doppler principle, the transducers receive pulse waves in rivers or in a reservoir, transmitted in directions and reflected by suspended particles in fluids. Then a Doppler radar determines moving direction of the particles according to a change in audio and calculates the speed of the particles by Doppler principle. Assuming that the particles move with the current, the flowing direction of the particles is considered as the flowing direction of the current.

A supersonic Doppler radar, however, requires accurate installation for calculating velocity components in different dimensions, and the supersonic Doppler radar reflects all suspended particles in fluids. Therefore, the system will misjudge if there are a huge number of impurities in water. Besides that, the supersonic Doppler radar does not fit for measuring a speed of a current in river and reservoirs far away.

Therefore, microwave Doppler radar is invented. Compared with the supersonic Doppler radar using pulse wave to measure, the microwave Doppler radar measures a speed of a current in a long term to calculate an average of a speed of a current by using continuous waves or frequency modulated continuous waves. In hence, the microwave Doppler radar does not need accurate installation and analysis of a speed of a current. A general measuring formula of a microwave Doppler radar is that:

$$F_d = \frac{2v \cdot \cos\theta}{\lambda} \quad (1)$$

where v is a relative speed of a current for a radar, $\theta$ is an angle between a velocity vector in a direction of a current and a line of radar centers, and $\lambda$ is a wavelength of center frequency from an output signal (radio-frequency signal in general)

However, there are also faults for a microwave Doppler radar.

First, according to the formula (1), Doppler shift $F_d$ is directly relative to the center frequency of a radio-frequency signal (RF signal), and the center frequency is easily changed with temperature and time to drift the center frequency of the RF signal and further an error in Doppler shift.

Furthermore, an error in the angle between the velocity vector in a direction of a current and a line of radar centers is attributed to inaccurate installation angle of the microwave Doppler radar. For instance, an antenna pattern is vertical to the surface of the water if $\theta$ is 90 degree. It is known that the velocity component is 0 according to the formula. In addition, the angle $\theta$ is correspondent to 90 degree in the condition of the largest velocity component. If so, the microwave Doppler radar has to install on the surface of the water (surface of fluids)

Therefore, the industry has to develop a new flow velocity meter to solve the above problems.

SUMMARY OF THE INVENTION

It is therefore a primary object of the present invention to provide a flow velocity meter for providing output signals with certain center frequency and self corrects according to an installation angle to solve the above problem.

According to the present invention, a flow velocity meter for measuring a speed of a current under test comprises a signal generating module, a signal receiving module, an inclinometer, and a signal processing module. The signal generating module comprises a phase locked loop for generating a continuous wave signal with a first frequency, and a multiplier, electrically connected with the phase locked loop, for increasing frequency for the continuous wave signal to generate an output signal with a second frequency and for emitting the output signal to the current under test. The signal receiving module is used for receiving a reflecting signal with a third frequency from the current under test. The inclinometer is used for measuring a depression angle and a horizontal angle of the flow velocity meter. The signal processing module, electrically connected to the signal receiving module and the inclinometer, is used for calculating the speed of the current under test according to a difference between the third and the second frequencies, the depression angle and the horizontal angle.

In one aspect of the present invention, the second frequency is N times as the first frequency, and N is an integer.

In another aspect of the present invention, the second frequency is two times as the first frequency.

In still another aspect of the present invention, the phase locked loop is electrically connected to the signal processing module. The signal processing module generates a control signal. The phase locked loop receives the control signal and generates the continuous wave signal according to the control signal.

In still another aspect of the present invention, the phase locked loop comprises, a voltage-controlled oscillator for generating the continuous wave signal according to a control voltage, a controllable frequency divider, electrically connected to the voltage-controlled oscillator and the signal processing module, for dividing frequency for the continuous wave signal according to the control signal to generate a frequency divided signal, a phase detector, electrically connected to the controllable frequency divider, for comparing a phase difference between a reference signal and the frequency divided signal to generate a phase difference signal, and a loop filter, electrically connected to the phase detector and the voltage-controlled oscillator, for generating the control voltage according to the phase difference signal.

In still another aspect of the present invention, the inclinometer is a micro-electro-mechanical inclinometer, and is electrically connected to the signal processing module through an interface, for allowing the signal processing module to directly read the depression angle and the horizontal angle from the micro-electro-mechanical inclinometer through the interface.

In yet another aspect of the present invention, the interface complies with RS-232 or SPI interface.

According to the present invention, a flow velocity meter for measuring a speed of a current under test comprises a signal generating module, a signal receiving module, an inclinometer, and a signal processing module. The signal generating module is used for increasing frequency for a continuous wave signal with a first frequency to generate an output signal with a second frequency. The signal receiving module is used for receiving a reflecting signal with a third frequency reflected from the current under test. The inclinometer is used for measuring a depression angle and a horizontal angle of the flow velocity meter. The signal processing module, electrically connected to the signal receiving module and the inclinometer, is used for calculating the speed of the current under test according to a difference between the second and the third frequencies, the depression angle and the horizontal angle.

In one aspect of the present invention, the phase locked loop is electrically connected to the signal processing module. The signal processing module generates a control signal. The phase locked loop receives the control signal and generates the continuous wave signal according to the control signal.

In another aspect of the present invention, the phase locked loop comprises a voltage-controlled oscillator for generating the continuous wave signal according to a control voltage, a controllable frequency divider, electrically connected to the voltage-controlled oscillator and the signal processing module, for dividing frequency for the continuous wave signal according to the control signal to generate a frequency divided signal, a phase detector, electrically connected to the controllable frequency divider, for comparing a phase difference between a reference signal and the frequency divided signal to generate a phase difference signal, and a loop filter, electrically connected to the phase detector and the voltage-controlled oscillator, for generating the control voltage according to the phase difference signal.

In still another aspect of the present invention, the inclinometer is a micro-electro-mechanical inclinometer, and is electrically connected to the signal processing module through an interface, for allowing the signal processing module to directly read the depression angle and the horizontal angle from the micro-electro-mechanical inclinometer through the interface.

In yet another aspect of the present invention, the interface complies with RS-232 or SPI interface.

According to the present invention, a flow velocity meter for measuring a speed of a current under test comprises a signal generating module, a signal receiving module, and a signal processing module. The signal generating module comprises a phase locked loop for generating a continuous wave signal with a first frequency, and a multiplier, electrically connected to the phase locked loop, for increasing frequency for the continuous wave signal to generate an output signal with a second frequency and for emitting the output signal to the current under test. The signal receiving module is used for receiving a reflecting signal with a third frequency reflected from the current under test. The signal processing module, electrically connected to the signal receiving module, is used for calculating the speed of the current under test according to a difference between the third and the second frequencies.

In one aspect of the present invention, the second frequency is N times as the first frequency, and N is an integer.

In another aspect of the present invention, the second frequency is two times as the first frequency.

In still another aspect of the present invention, the phase locked loop is electrically connected to the signal processing module. The signal processing module generates a control signal. The phase locked loop receives the control signal and generates the continuous wave signal according to the control signal.

In yet another aspect of the present invention, the phase locked loop comprises a voltage-controlled oscillator for generating the continuous wave signal according to a control voltage, a controllable frequency divider, electrically connected to the voltage-controlled oscillator and the signal processing module, for dividing frequency for the continuous wave signal according to the control signal to generate a frequency divided signal, a phase detector, electrically connected to the controllable frequency divider, for comparing a phase difference between a reference signal and the frequency divided signal to generate a phase difference signal, and a loop filter, electrically connected to the phase detector and the voltage-controlled oscillator, for generating the control voltage according to the phase difference signal.

Compared to the prior art, the flow velocity meter of the present invention provides output signals with certain center frequency and self corrects according to an installation angle so that the flow velocity meter of the present invention does not cause an error in Doppler shift on account of center frequency shifts of output signals and installation angle. That is to say that the flow velocity meter of the present invention still measures the speed of the current under test accurately in the influence of temperature and time.

These and other features, aspects and advantages of the present disclosure will become understood with reference to the following description, appended claims and accompanying figures.

DETAILED DESCRIPTION OF THE PREFERRED EMBODIMENTS

Figure 1:
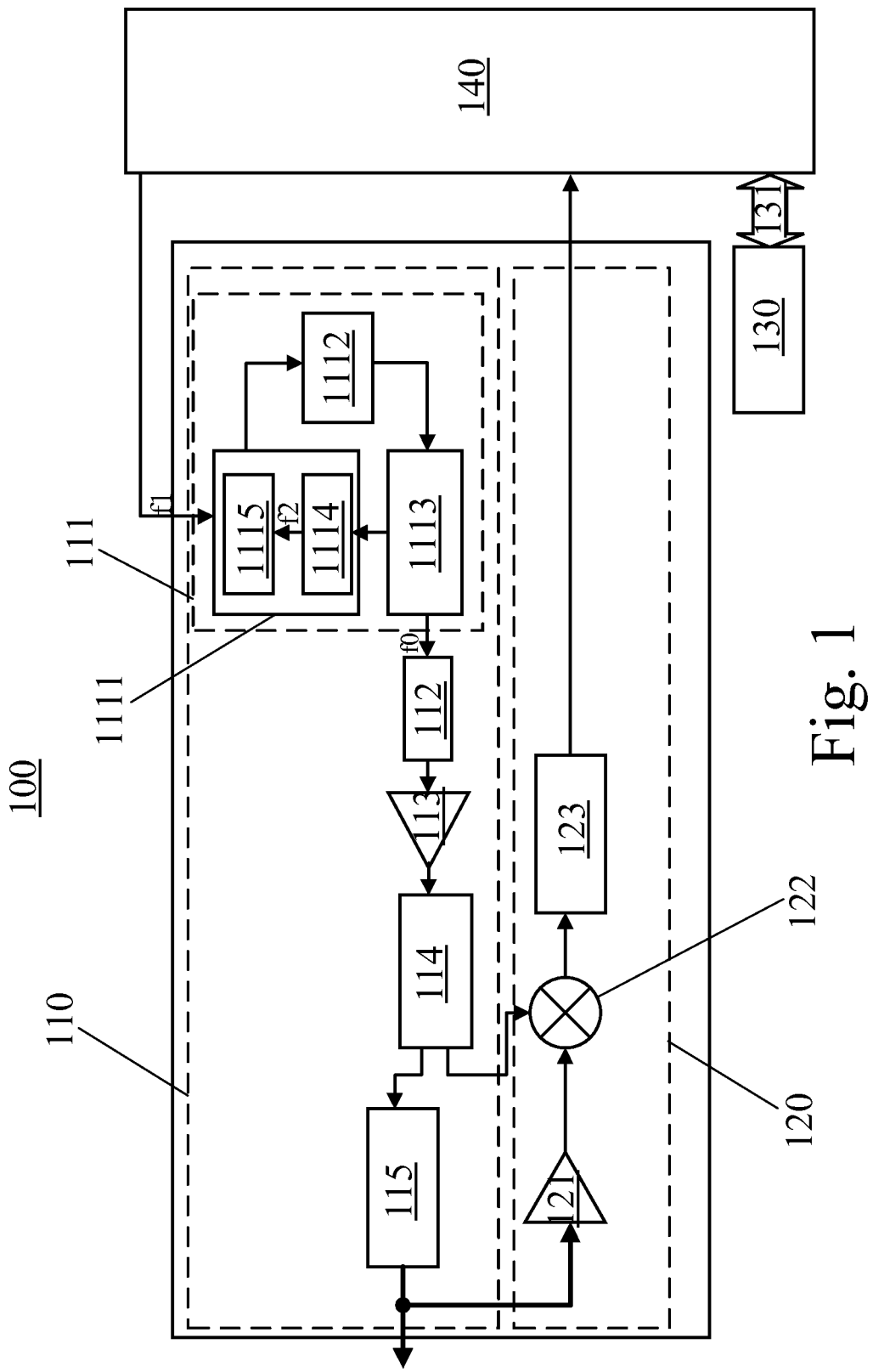
FIG. 1 is a functional diagram of a flow velocity meter according to the present invention.

Please refer to FIG. 1. FIG. 1 is a functional diagram of a flow velocity meter 100 according to the present invention. As FIG. 1 shows, the flow velocity meter 100 according to the present invention 100 comprises a signal generating module 110, a signal receiving module 120, an inclinometer 130, and a signal processing module 140. The signal generating module 110 is used for generating a continuous wave signal with a specific frequency. The output signal in the preferred embodiment according to the present invention is a RF signal. As FIG. 1 shows, the signal generating module 110 comprises a phase locked loop 111, a multiplier 112, an amplifier 113, a circulator 114 and a band-pass filter 115. The signal processing module 140 is electrically connected to the signal generating module 110, the signal receiving module 120 and the inclinometer 130, as FIG. 1 illustrating.

Please take a notice that the signal generating module 110 utilizes the phase locked loop 111 to generate a continuous wave signal with a first frequency. The signals generated by the phase locked loop 111 are stable because of a feedback system of the phase locked loop 111. In other words, the center frequency of the continuous wave stably maintains at the first frequency so that the output signals from the signal generating module 110 have stable center frequency. Therefore, the offset by Doppler shift is not going to occur afterwards.

Figure 2:
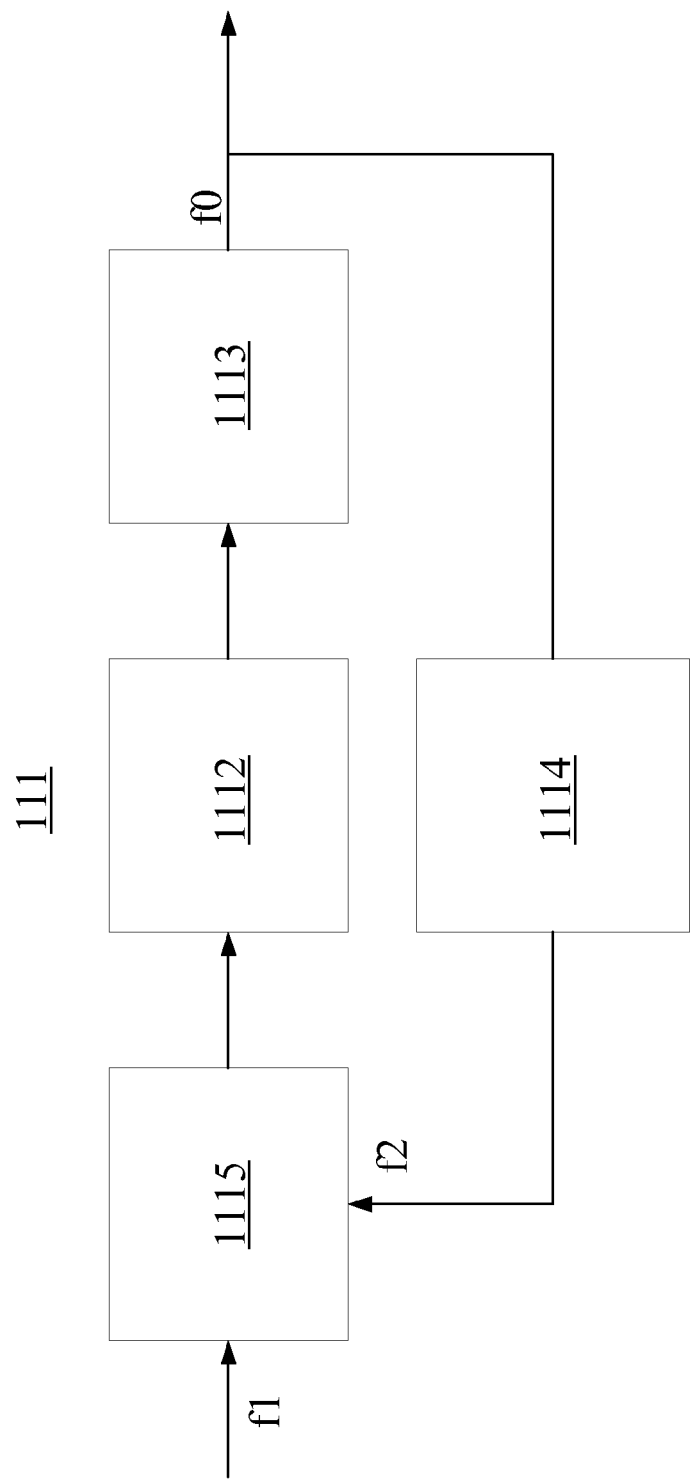
FIG. 2 showing a functional block diagram of a phase locked loop, the phase locked loop comprises a phase detector, a loop filter, a voltage-controlled oscillator and a frequency divider.

Please refer to FIG. 2 showing a functional block diagram of a phase locked loop 111, the phase locked loop 111 comprises a phase detector 1115, a loop filter 1112, a voltage-controlled oscillator 1113 and a frequency divider 1114. The basic operating principle is in the following. First, the phase detector 1115 compares a reference signal f1 and a frequency divided signal f2 from the frequency divider 1114 (i.e. a result of an output signal from the voltage-controlled oscillator 1113 being frequency-divided) and outputs a phase difference signal according to the comparison. The loop filter 1112 filters high frequency signals and a part of noises in the phase difference signal to output a control voltage to the voltage-controlled oscillator 1113. The voltage-controlled oscillator 1113 generates an output signal $f_o$ according to direct voltages.

As FIG. 2 illustrates, the phase locked loop 111 has a negative feedback mechanism for the reference signal $f_1$ being equalized to the frequency divided signal $f_2$. That is to say that when the frequency and phase of the reference signal $f_1$ are different to those of the frequency divided signal $f_2$, the mechanism will keep working until the frequency and phase of the reference signal $f_1$ are equal to those of the frequency divided signal $f_2$. At this time, the system is keeping stable, and the frequency of the output signal $f_o$ from the voltage-controlled oscillator 1113 maintains stability (N times of the reference signal $f_1$) so that frequency drift no more occurs.

This is how the present invention utilizes the character of the phase locked loop to stabilize the frequency of the output signal. Please keep referring to FIG. 1. The phase locked loop 111 also comprises similar components. In the embodiment, the phase locked loop 111 comprises a frequency synthesizer 1111, a loop filter 1112 and a voltage-controlled oscillator 1113. The frequency synthesizer 1111 comprises a frequency divider 1114 and a phase detector 1115. Functions of the phase detector 1115 are similar to those of the phase detector 1115. The phase detector 1115 compares a reference signal $f_1$ and a frequency divided signal $f_2$ from the frequency divider 1114 (i.e. a result of an output signal from the voltage-controlled oscillator 1113 being frequency-divided) and outputs a phase difference signal according to the comparison. The function of the loop filter 1112 is the same with that of the loop filter 1112 for filtering high frequency signals and a part of noises in the phase difference signal to output a control voltage to the voltage-controlled oscillator 1113. The function of the voltage-controlled oscillator 1113 is also the same with that of the voltage-controlled oscillator 1113 for generating an output signal $f_o$ according to direct voltages.

In hence, the center frequency of the output signal $f_O$ will not drift for temperature or time but stably maintains at the predetermined first frequency. Furthermore, the frequency synthesizer 1111 is controlled by the signal processing module 140 which means the center frequency of the output signal $f_O$ is also controlled by the signal processing module.

Figure 3:
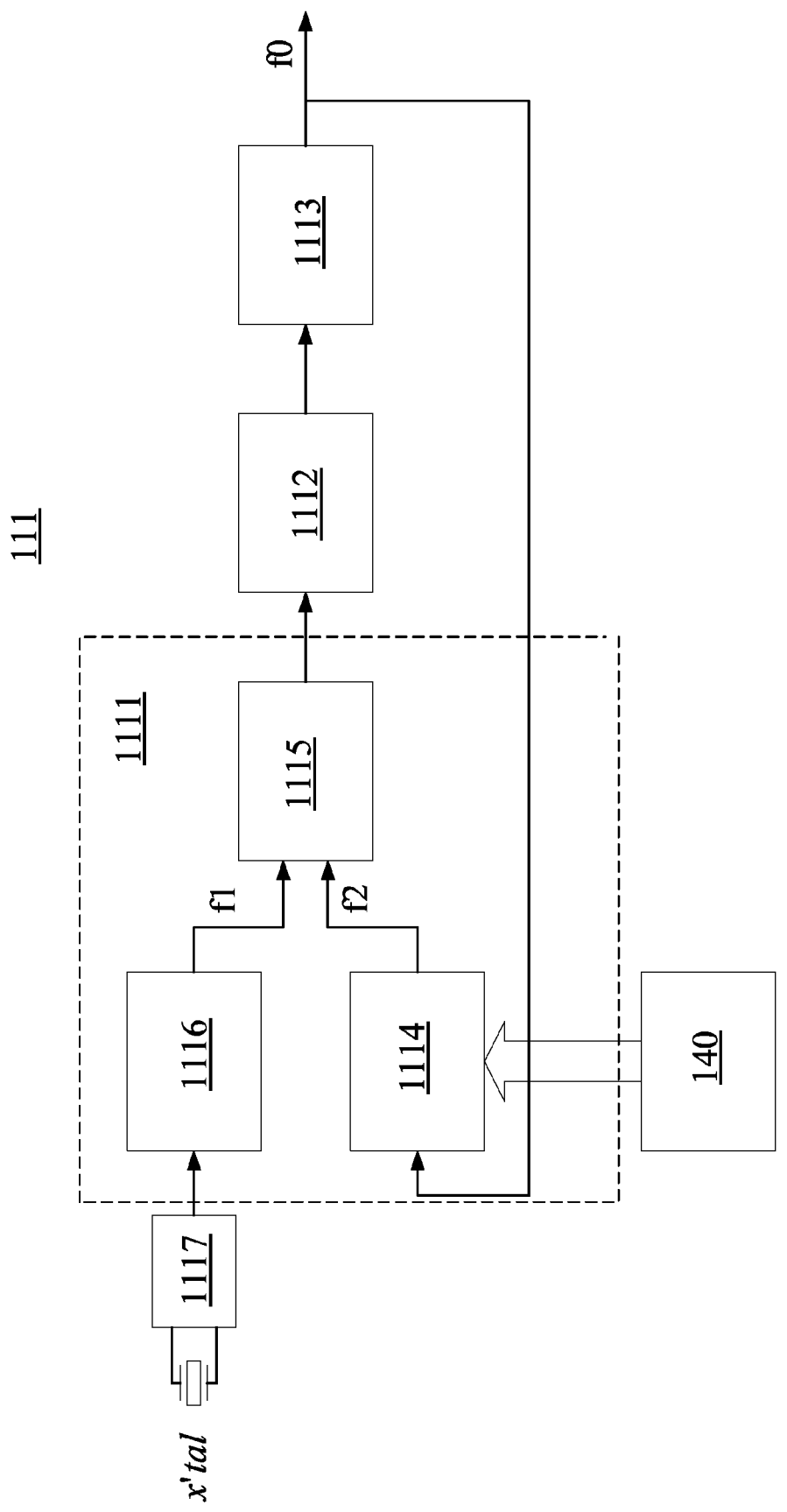
FIG. 3 is a detailed diagram of the phase locked loop according to the present invention.

Please refer to FIG. 3. FIG. 3 is a detailed diagram of the phase locked loop 111 according to the present invention. In FIG. 3, the frequency synthesizer 1111 comprises a phase detector 1115, a frequency divider 1114 and a frequency divider 1116. In the embodiment, the phase detector 1115 compares a reference signal $f_1$ (i.e. a result of an output signal from an oscillator 1117 being frequency-divided by the frequency divider 1116) and a frequency divided signal $f_2$ from the frequency divider 1114 (i.e. a result of an output signal from the voltage-controlled oscillator 1113 being frequency-divided) and outputs a phase difference signal according to the comparison. The loop filter 1112 filters high frequency signals and a part of noises in the phase difference signal to output a control voltage to the voltage-controlled oscillator 1113. The voltage-controlled oscillator 1113 generates an output signal $f_O$ according to direct voltages.

The signal processing module 140 is used for controlling frequency-divided percent of the frequency divider 1114 to maintain the output signal of the voltage-controlled oscillator 1113 at the predetermined first frequency.

Please pay attention that such design is only an embodiment according to the present invention, not restriction to the present invention. For example, the signal processing module 140 is also used for controlling the frequency divider 1116. Therefore, the signal processing module 140 controls the reference signal input to the phase detector 1115 and further the output signal of the voltage-controlled oscillator 1113. Such relative change is also in the sphere of the present invention.

Next, the output signal of the voltage-controlled oscillator 1113 is frequency-increased via the multiplier 112 to become a high frequency signal (RF signal) with a second frequency. The second frequency is N times as the first frequency, and N is in integer like two or four or more. Please take a notice that in the signal generating module 110 and the signal receiving module 120, both do not take operating frequency of carrier as design frequency of each internal circuit module. Because the higher frequency is, the more skin effect on the surface is, i.e. the more power consumption of a microstrip line in unit length is. In hence, the voltage-controlled oscillator 1113, all active and passive components and the microstrip line according to the present invention are all designed and developed in ½ or ¼ RF operating frequency band. The frequency is multiplied to comply with the RF operating frequency at transceiver of an antenna module. Therefore, it reduces signal losses for the whole microstrip line to cost down high frequency components.

In hence, the multiplier 112 in the embodiment is used for increasing frequency which means the output signal from the voltage-controlled oscillator 1113 at the first frequency is increased to the second frequency and processed via the circulator 114 and the band-pass filter 115 before being output to the current under test.

A reflecting signal is generated from the output signal reflected by the current under test. Owing to Doppler effect, the reflecting signals received by the signal receiving module 120 are at different frequencies based on different flow speeds. It is assumed that the signal received by the signal receiving module 120 is at a third frequency. A flow speed of the current under test is calculated by a difference between the third and the second frequency (Doppler shift). In practical operation, the signal receiving module 120 comprises a low noise amplifier 121, a mixer 122 and a low pass filter 123. The low noise amplifier 121 amplifies the reflecting signal after receiving, the mixer 122 mixes the output signal and the reflecting signal to generate a medium frequency signal, and the low pass filter 123 low-pass filters the medium signal to generate a beat frequency signal. And then the beat frequency signal is transmitted to the signal processing module 140 to be further calculated to have a flow speed.

Figure 4:
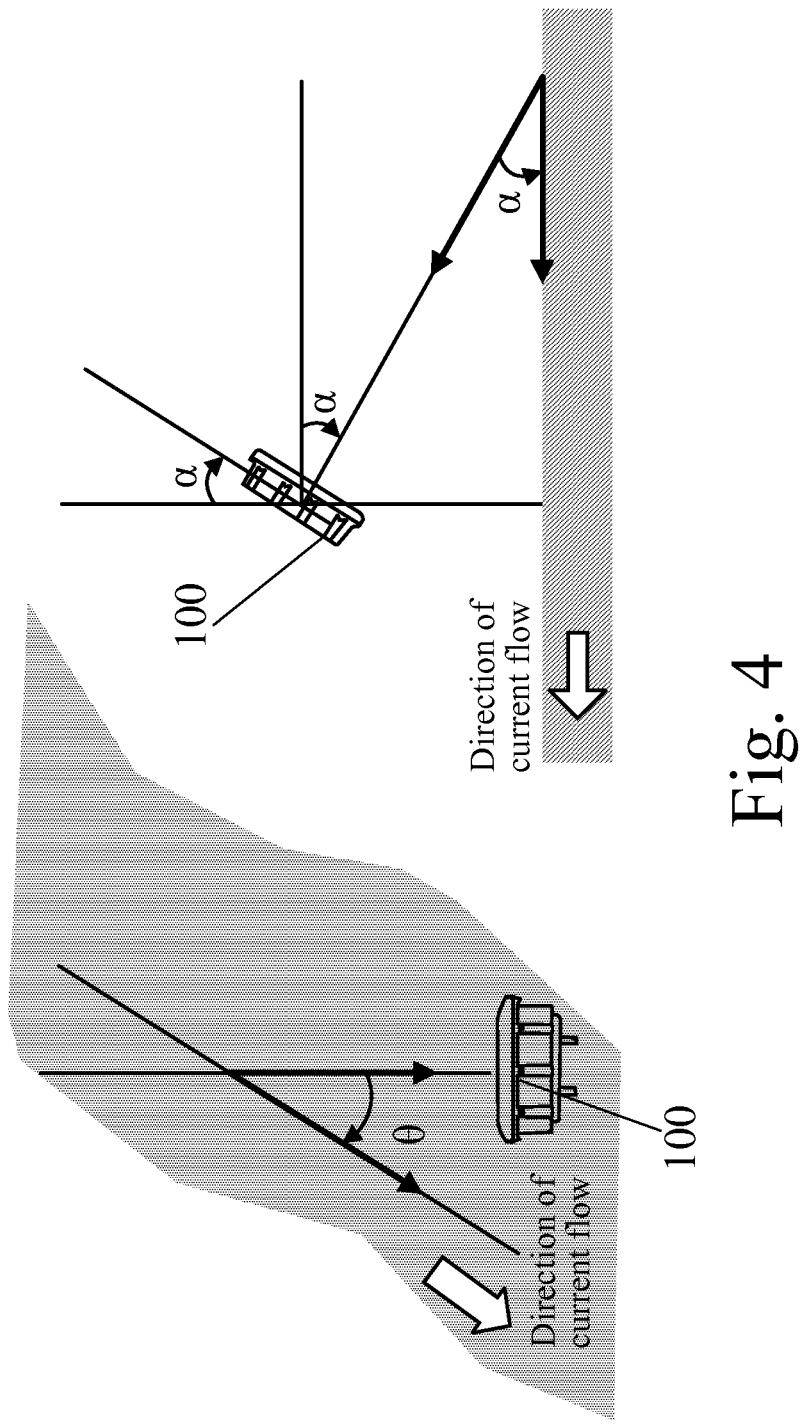
FIG. 4 shows a diagram showing a depression angle of the flow velocity meter and an angle between the current and the flow velocity meter.

Please pay attention that the flow velocity meter probably has an error for Doppler shift and further the calculated flow speed if the flow velocity meter is not installed at complete horizon. Therefore, the flow velocity meter 100 according to the present invention is capable of adjusting the orientation when being installed. The flow velocity meter 100 in the embodiment comprises an inclinometer 130 for measuring a depression angle α of a flow velocity meter. The inclinometer 130 is electrically connected to the signal processing module 140 via a RS-232 or SPI interface 131 and output the measured depression angle α to the signal processing module 140 through the interface 131 so that the signal processing module 140 reads the depression angle α and then calculate a correct flow speed according to the depression angle α and the frequency difference (Doppler shift) between the second and the third frequency. Please refer to FIG. 4. FIG. 4 shows a diagram showing of a depression angle of the flow velocity meter and an angle between the current and the flow velocity meter. As FIG. 4 shows, the flow velocity meter 100 recalculates an accurate flow speed according to the formula (2).

$$V \cdot \cos(\alpha) \cdot \cos(\theta) = f_d C/2 \cdot F \quad (2)$$

where V represents velocity of the current, $f_d$ represents Doppler shift, C represents speed of light, and f means a center frequency of a signal from a flow velocity meter (the second frequency). Please refer to FIG. 4 again. The angle θ between the flow velocity meter and the current is fixed and recorded in the system when the flow velocity meter is installed. The angle α is adjustable with water level in seasons, and the inclinometer 130 reads data to the signal processing module 140 for calculating a flow speed when a is adjusted. Therefore, the signal processing module 140 acquires all information including Doppler shift, a center frequency of an output signal, an angle θ between the flow velocity meter and the current and a depression angle α. The signal processing module 140 calculates a speed of the current under test based on the information and the formula (2).

Please take a notice that the embodiment according to the present invention comprises a multiplier and an inclinometer. However it is only a preferred embodiment of the present invention, not a limit to the present invention. For instance, the present invention is capable of not adopting the increasing circuit which means it uses internal components at relatively high frequency, and thus the voltage-controlled oscillator directly generates an output signal with carrier frequency. On the other hand, the voltage processing module calculates flow speed of the current under test according to both of Doppler shifts if the present invention does not use the inclinometer. And the calculating method has been well-known in the business and is not further described therefore. In other words, an increasing circuit and an inclinometer are optional components in practical application, and designers install or uninstall the two components in option. Such relative change is also in a sphere of the present invention.

Compared to the prior art, the flow velocity meter of the present invention provides output signals with stable center frequency, not changing with time or temperature. In addition, the flow velocity meter comprises an increasing circuit for most components operating at lower frequencies to save cost and reduce a signal loss of whole microstrip lines. Furthermore, the flow velocity meter comprises an inclinometer for measuring a depression angle between a water level and a normal direction of the flow velocity meter and measuring a horizontal angle. The flow velocity meter can be adjusted its orientation when being installed according to the measured angles. In sum, the flow velocity meter is more efficient to accurately calculate a flow speed of a current under test without influence for the environment or manual operation.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A flow velocity meter for measuring a speed of a current under test, comprising:
    a signal generating module comprising:
        a phase locked loop for generating a continuous wave signal with a first frequency; and
        a multiplier, electrically connected with the phase locked loop, for increasing frequency for the continuous wave signal to generate an output signal with a second frequency and for emitting the output signal to the current under test;
    a signal receiving module for receiving a reflecting signal with a third frequency from the current under test;
    an inclinometer for measuring a depression angle and a horizontal angle of the flow velocity meter; and
    a signal processing module, electrically connected to the signal receiving module and the inclinometer, for calculating the speed of the current under test according to a difference between the third and the second frequencies, the depression angle and the horizontal angle.

2. The flow velocity meter of claim 1, wherein the second frequency is N times as the first frequency, and N is an integer.

3. The flow velocity meter of claim 1, wherein the second frequency is two times as the first frequency.

4. The flow velocity meter of claim 1, wherein the phase locked loop is electrically connected to the signal processing module, the signal processing module generates a control signal, the phase locked loop receives the control signal and generates the continuous wave signal according to the control signal.

5. The flow velocity meter of claim 4, wherein the phase locked loop comprises:
    a voltage-controlled oscillator for generating the continuous wave signal according to a control voltage;
    a controllable frequency divider, electrically connected to the voltage-controlled oscillator and the signal processing module, for dividing frequency for the continuous wave signal according to the control signal to generate a frequency divided signal;
    a phase detector, electrically connected to the controllable frequency divider, for comparing a phase difference between a reference signal and the frequency divided signal to generate a phase difference signal; and
    a loop filter, electrically connected to the phase detector and the voltage-controlled oscillator, for generating the control voltage according to the phase difference signal.

6. The flow velocity meter of claim 1, wherein the inclinometer is a micro-electro-mechanical inclinometer, and is electrically connected to the signal processing module through an interface, for allowing the signal processing module to directly read the depression angle and the horizontal angle from the micro-electro-mechanical inclinometer through the interface.

7. The flow velocity meter of claim 6, wherein the interface complies with RS-232 or SPI interface.

8. A flow velocity meter for measuring a flow speed of a current under test, comprising:
   a phase locked loop for generating a continuous wave signal with a first frequency;
   a signal generating module for increasing frequency for the continuous wave signal with the first frequency to generate an output signal with a second frequency;
   a signal receiving module for receiving a reflecting signal with a third frequency reflected from the current under test;
   an inclinometer for measuring a depression angle and a horizontal angle of the flow velocity meter; and
   a signal processing module, electrically connected to the signal receiving module and the inclinometer, for calculating the speed of the current under test according to a difference between the second and the third frequencies, the depression angle and the horizontal angle.

9. The flow velocity meter of claim 8, wherein the phase locked loop is electrically connected to the signal processing module, the signal processing module generates a control signal, the phase locked loop receives the control signal and generates the continuous wave signal according to the control signal.

10. The flow velocity meter of claim 9, wherein the phase locked loop comprises:
    a voltage-controlled oscillator for generating the continuous wave signal according to a control voltage;
    a controllable frequency divider, electrically connected to the voltage-controlled oscillator and the signal processing module, for dividing frequency for the continuous wave signal according to the control signal to generate a frequency divided signal;
    a phase detector, electrically connected to the controllable frequency divider, for comparing a phase difference between a reference signal and the frequency divided signal to generate a phase difference signal; and
    a loop filter, electrically connected to the phase detector and the voltage-controlled oscillator, for generating the control voltage according to the phase difference signal.

11. The flow velocity meter of claim 8, wherein the inclinometer is a micro-electro-mechanical inclinometer, and is electrically connected to the signal processing module through an interface, for allowing the signal processing module to directly read the depression angle and the horizontal angle from the micro-electro-mechanical inclinometer through the interface.

12. The flow velocity meter of claim 11, wherein the interface complies with RS-232 or SPI interface.

13. A flow velocity meter for measuring a speed of a current under test, comprising:
    a signal generating module comprising:
      a phase locked loop for generating a continuous wave signal with a first frequency; and
      a multiplier, electrically connected to the phase locked loop, for increasing frequency for the continuous wave signal to generate an output signal with a second frequency and for emitting the output signal to the current under test;
    a signal receiving module for receiving a reflecting signal with a third frequency reflected from the current under test; and
    a signal processing module, electrically connected to the signal receiving module, for calculating the speed of the current under test according to a difference between the third and the second frequencies.

14. The flow velocity meter of claim 13, wherein the second frequency is N times as the first frequency, and N is an integer.

15. The flow velocity meter of claim 14, wherein the second frequency is two times as the first frequency.

16. The flow velocity meter of claim 13, wherein the phase locked loop is electrically connected to the signal processing module, the signal processing module generates a control signal, the phase locked loop receives the control signal and generates the continuous wave signal according to the control signal.

17. The flow velocity meter of claim 16, wherein the phase locked loop comprises:
    a voltage-controlled oscillator for generating the continuous wave signal according to a control voltage;
    a controllable frequency divider, electrically connected to the voltage-controlled oscillator and the signal processing module, for dividing frequency for the continuous wave signal according to the control signal to generate a frequency divided signal;
    a phase detector, electrically connected to the controllable frequency divider, for comparing a phase difference between a reference signal and the frequency divided signal to generate a phase difference signal; and
    a loop filter, electrically connected to the phase detector and the voltage-controlled oscillator, for generating the control voltage according to the phase difference signal.

\* \* \* \* \*